June 12, 1928.

W. H. SOMMER

ROD MILL

Filed Dec. 30, 1925

INVENTOR.
William H. Sommer
ATTY

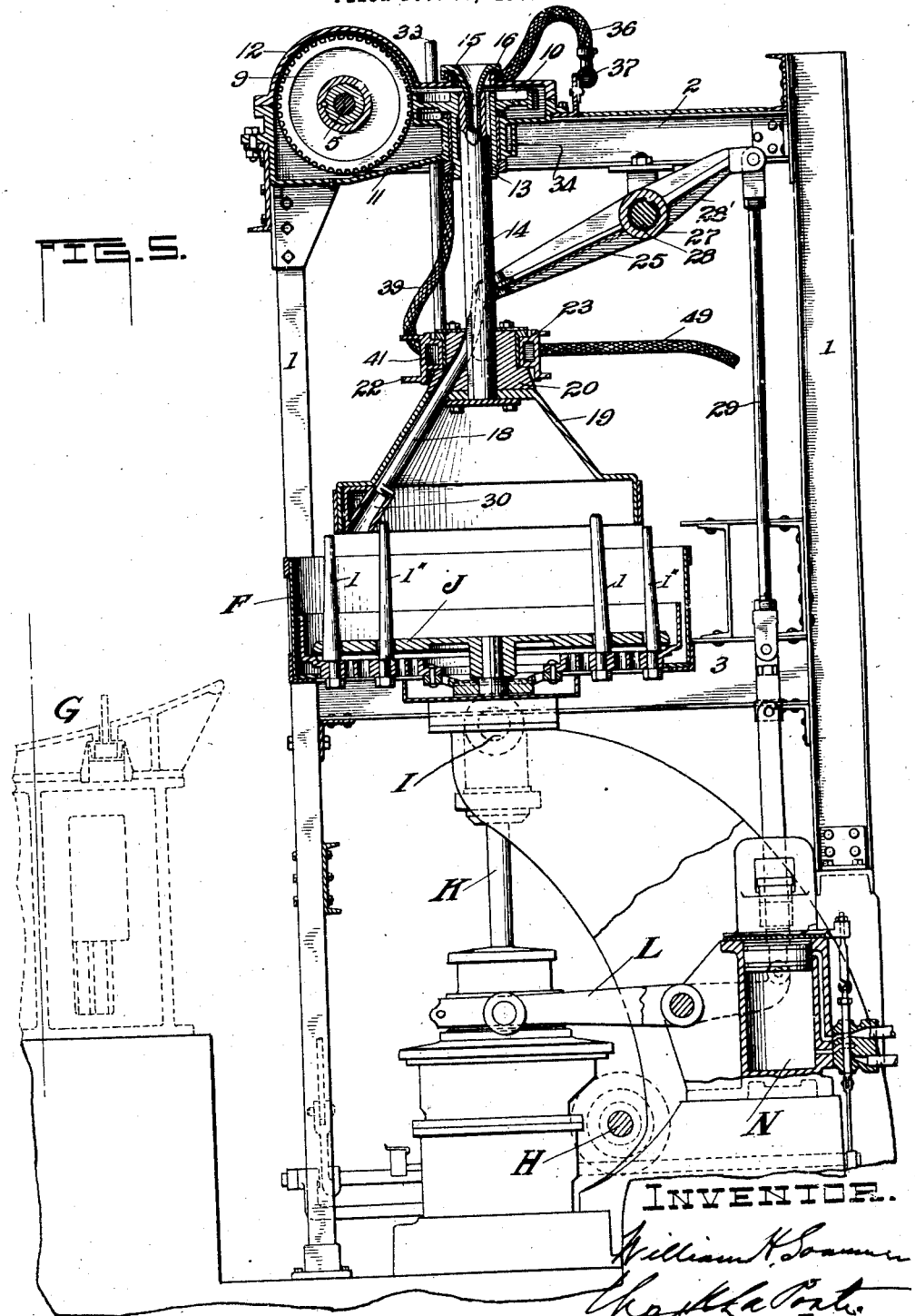

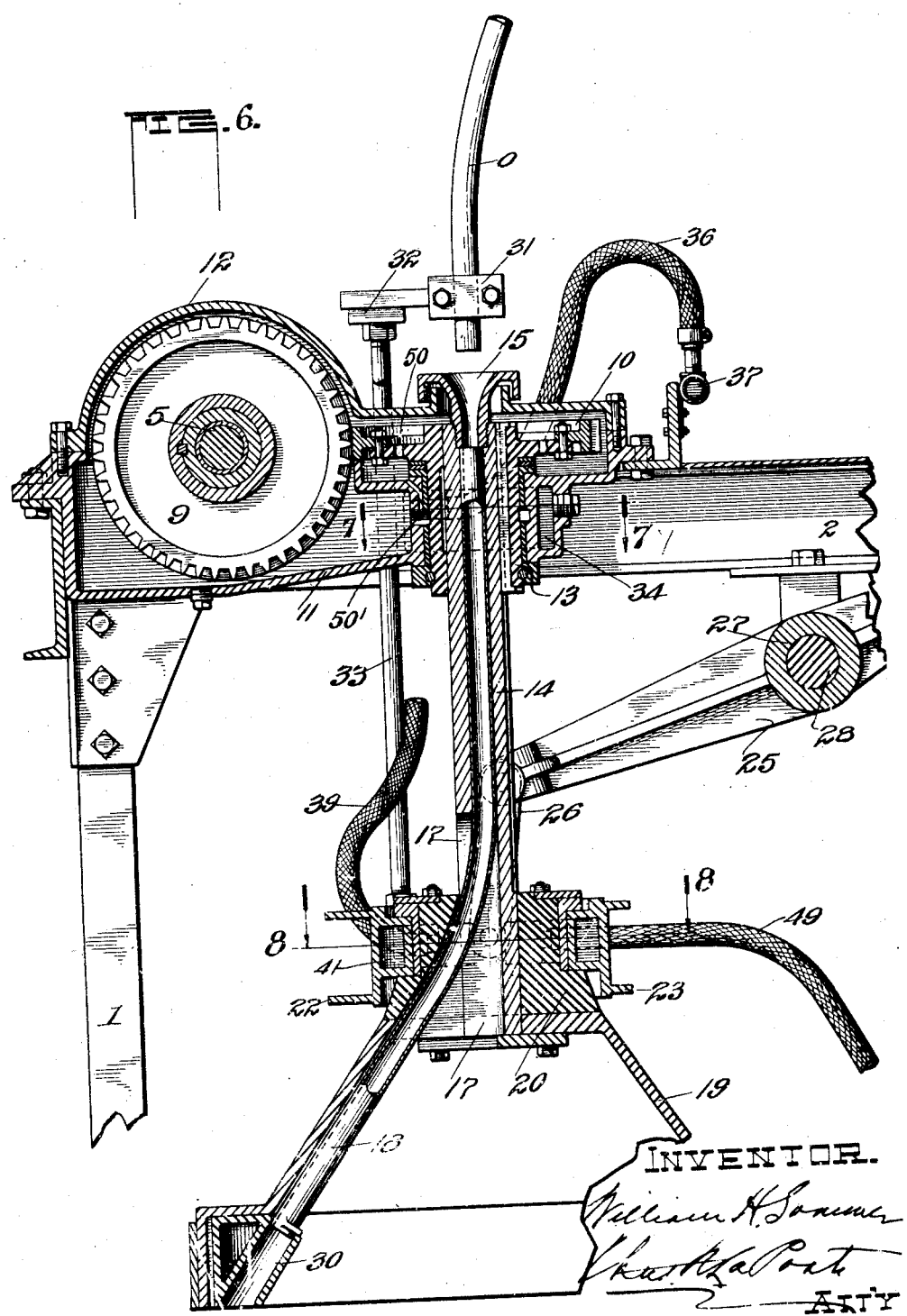

June 12, 1928.  
W. H. SOMMER  
ROD MILL  
Filed Dec. 30, 1925
1,672,917
6 Sheets-Sheet 6
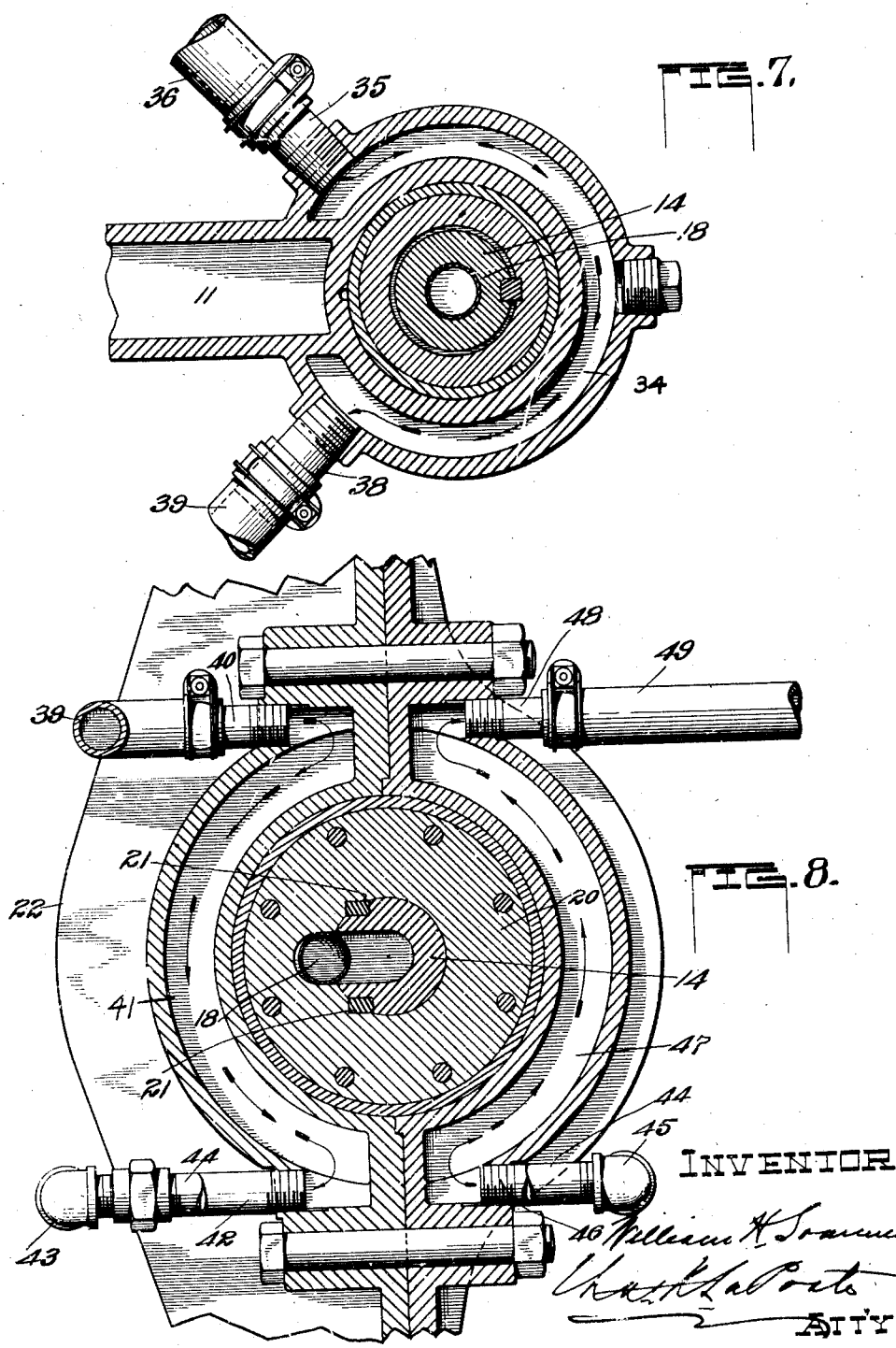

Patented June 12, 1928.

1,672,917

UNITED STATES PATENT OFFICE.

WILLIAM H. SOMMER, OF PEORIA, ILLINOIS.

ROD MILL.

Application filed December 30, 1925. Serial No. 78,419.

This invention has reference to rod mills and particularly to a device for guiding the rolled rods into a receiver or basket, which is preferably supported to be tilted for depositing the bundles of rods onto the rod bundle conveyor.

The invention has for its principal object to provide a non-rotatable, tiltable receiving basket into which the rods are deposited and coiled into bundles, and to associate therewith a continuously revoluble means for guiding the rods into said receiving basket, said revolving means being movable toward and from said receiving basket, whereby at the moment of tilting the basket said revolving means is moved away from the basket to permit it to be tilted and upon righting the basket to normal receiving position said revolving means is moved toward the basket into rod discharging position.

The invention has for a further object to connect the tiltable receiving basket and also to connect the continuously revolving means with a common source of power and to so time the operation of said connections that they may be actuated simultaneously, whereby as the basket is moved into tilting position the revolving means is moved away from the basket and as the basket is again tilted to receiving position the revolving means is moved toward the basket.

That the invention may be more fully understood reference is had to the accompanying drawings forming a part of the description, illustrating a preferred embodiment of the invention, in which:—

Fig. 5 is a vertical sectional view substantially as the same would appear if taken on the lines 5—5 Fig. 3 looking in the direction of the arrows in said figure, the figure being substantially on the same scale as that of Fig. 3;

Figure 1:
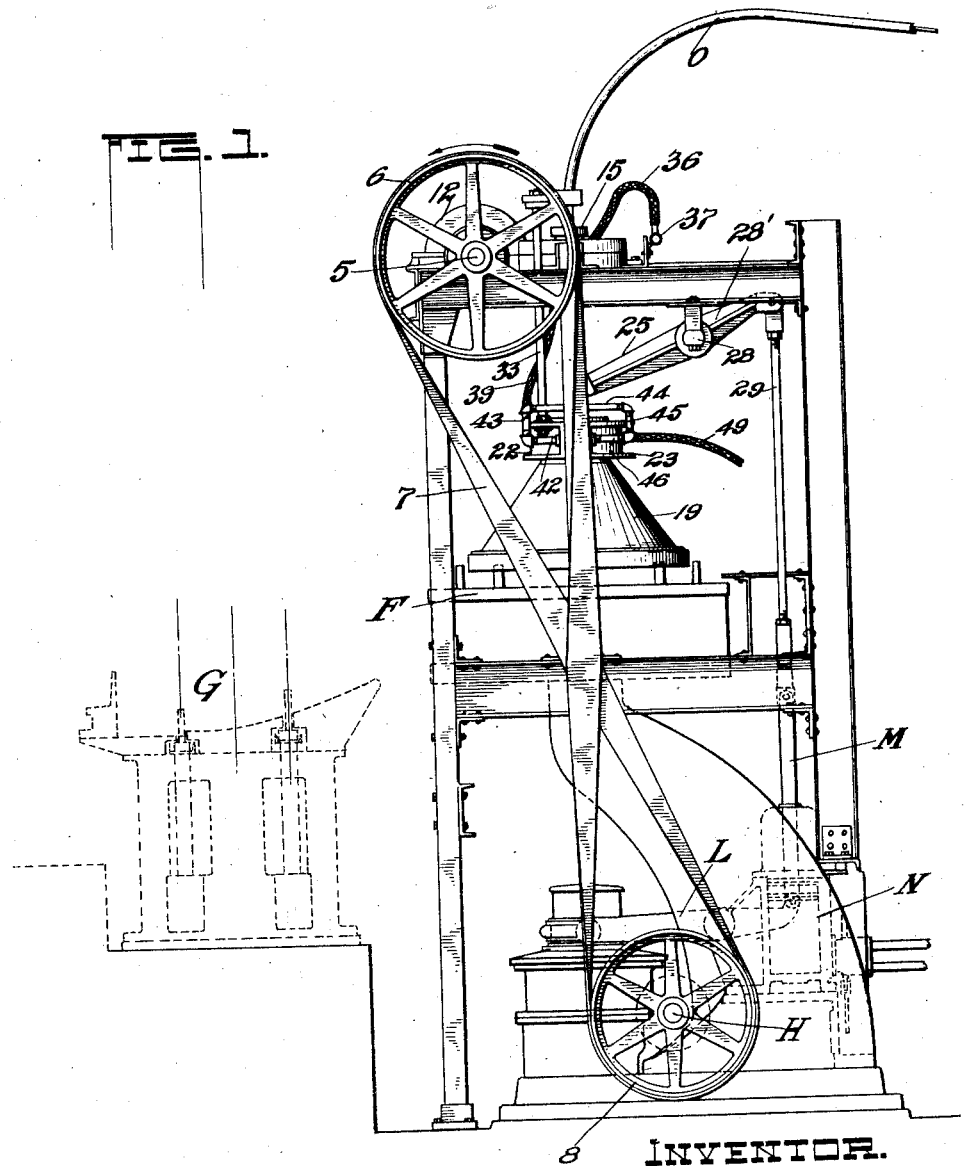
Fig. 1 is an end elevation of a structure embodying my invention, the parts being in normal operative position.

Fig. 6 is a sectional detail of the continuously revoluble guiding means and associated parts and illustrates on a somewhat larger scale similar parts which are also shown in Fig. 5 and includes the delivery end of the pipe which guides the rolled rods to the guiding means and shows the connections by means of which the delivery end of the rod pipe may be raised and lowered with said revoluble guiding means;

Fig. 7 is a sectional detail in plan substantially as the same would appear on the line 7—7 Fig. 6 looking in the direction of the arrows on said figure, and Fig. 8 is a detail in plan substantially as the same would appear if taken on the line 8—8 Fig. 6 looking in the direction of the arrows in said figure.

Like characters of reference denote corresponding parts throughout the figures.

In explanation of the adaptation and use of my invention to a rod mill it will be understood by those skilled in the art that the rods are rolled from billets which are heated in a furnace and rolled to proper size by sets of rollers, associated with "repeaters" in the usual way, the finished rods being deposited and coiled in the form of bundles in a plurality of receiving baskets from which they are discharged onto a rod bundle conveyor and conveyed to any suitable point. In approved mills of this character it has been the practice to support the receiving and tiltable basket for rotation, said basket being revolved at approximately the speed at which the rods travel in the operation of rolling and delivering the same to the basket, i. e. approximately 2700 feet a minute. It will thus be seen that with this method of rolling the rods and delivering the same to the revolving baskets that to discharge the bundles of rods therefrom said baskets must be gradually brought to a complete stop before the baskets are tilted to discharge the bundles therefrom and onto the rod bundle conveyor, and the baskets again righted and gradually brought up to speed again before the subsequently rolled rods can be delivered thereto. This places a limitation upon the capacity of the mill by slowing up considerably the feeding of the successive heated billets from the furnace to the reducing rolls. In addition to the objections thus stated is the consequent loss of energy and horse power incident to the stopping and starting of the revolving baskets. By my improved apparatus I not only save this loss of energy and power but remove the time incident, thereby speeding up the operation of the mill and hence producing a larger tonnage of rods in the same given time, and at considerably less expense, it being obvious that if the receiving basket is stationary and I provide a continuously revoluble guiding means for conveying the rolled rods to the basket that the billets may be fed in rapid succession from the furnace to the reducing rolls.

There is nothing new nor is there any change in the rod bundle conveyor over those in present day use. The receiving basket instead of being rotatable is stationary and it is supported and tilted in substantially the same manner and by substantially the same mechanism as that used in ordinary practice, the only difference being that I have disconnected the basket, designated F, from the ordinary and usual driving shaft H, see Fig. 5.

Figure 2:
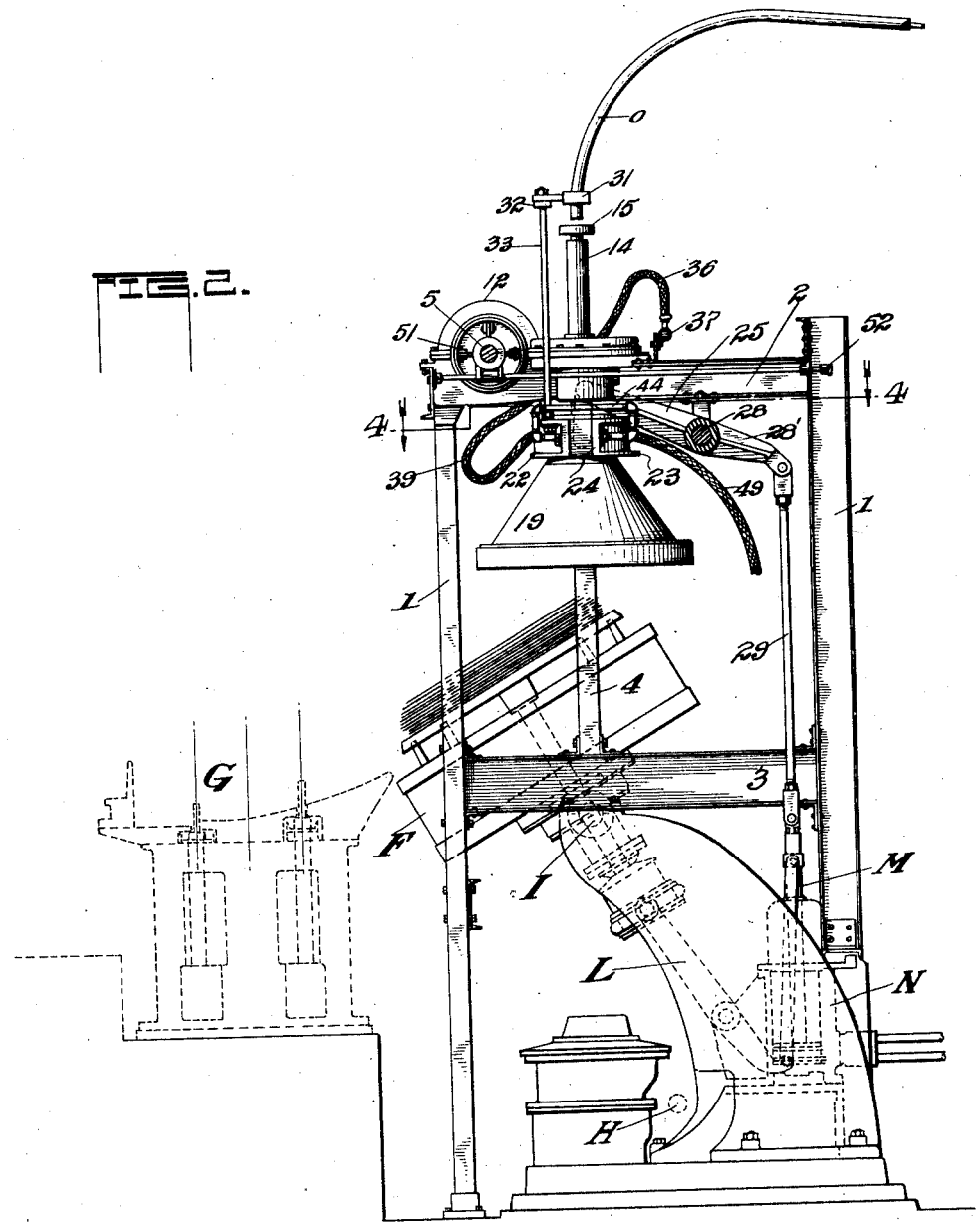
Fig. 2 is a view similar to Fig. 1 except that the receiving basket is shown in tilted position and the continuously revoluble guiding means is shown in a receded position, one of the cross head guide members being removed.

The basket F is not unlike those in present day practice, except that it does not revolve and is supported to be tilted on the pivot means I, reference being had to Fig. 5 showing the tiltable basket in normal receiving position and in Fig. 2 tilted into discharging position. The basket is provided with the usual and ordinary upstanding pins $i$ and $i''$ arranged in two circular rows and disposed in the basket is a reciprocal table J carried by a shaft K adapted to be reciprocated through the medium of a lever means L actuated from and by means of a piston rod M connected in operative manner with a steam cylinder N, the source of power to which is under the control of an attendant at some suitable point. The table J within the basket is provided with openings through which the pins $i$ and $i''$ project and upon which the table moves as the same is raised and lowered through the reciprocation of the shaft K. By examining Figs. 5 and 2 it will be readily understood, how, when the shaft K is reciprocated by the lever means L, the basket is swung on the pivot I and the table J is moved upwardly so as to discharge the bundle of rods from the receiving basket onto the rod bundle conveyor. With the exception of non-rotatably mounting the receiving basket F there is little or no change in the structure last described from that commonly well known, with the further exception of a connection, which will be described, with a piston rod M whereby the continuously revoluble guiding means for the rods is moved simultaneously away from and towards the receiving basket as it is tilted from receiving and to receiving position and from the same source of power.

To support the mechanism included with the continuously revoluble guides, I provide a suitable structure, preferably steel, comprising the upstanding frames 1 and the upper and mediately placed cross frames 2 and 3, which are suitably connected together. This frame structure includes other detailed frame parts which are unnecessary to describe and with the exception of the vertically disposed spaced guide members 4 mention will be made of the "frame" as a whole, unless particularly to describe some detailed part.

Figure 4:
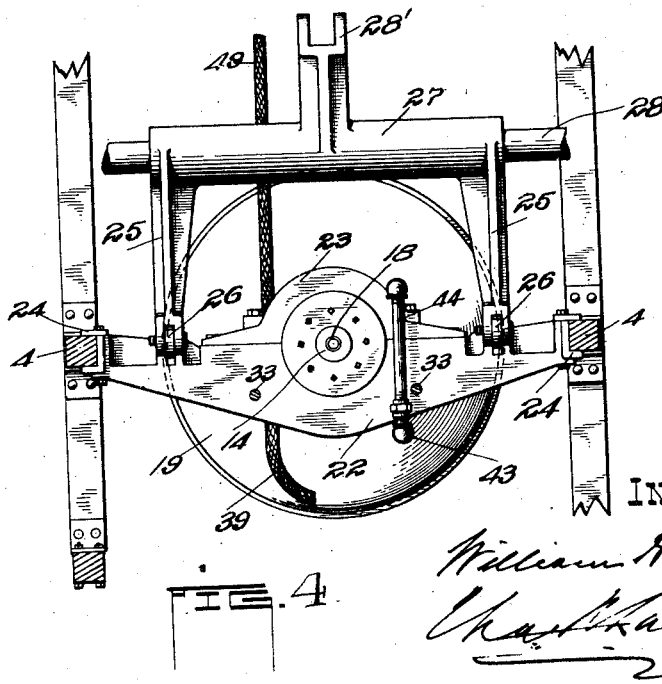
Fig. 4 is a detail in plan of parts shown in Fig. 3, and in particular, what is illustrated in Fig. 2 and substantially as the same would appear on the line 4—4 Fig. 2 looking in the direction of the arrows.

Suitably journaled in the "frame" at the upper portion thereof, and extending longitudinally, is an operating shaft 5 to one end of which is connected a pulley 6 driven by a belt 7 from a driving pulley 8 connected with one end of the shaft H which receives its power from some suitable source. Connected with shaft 5 at suitably spaced points are preferably helical driving gears 9 which mesh with and are adapted to operate the helical driven gears 10. As will be understood there is one set of driving and driven gears 9 and 10 for each mechanism associated with a basket F. These sets of gearing are carried in housings comprising the lower half sections 11 and the upper half sections 12 adapted to be suitably bolted together and to the "frame". The driven gear 10 has connected thereto and depending therefrom a hub and sleeve extension 13 which is normally disposed axially with the shaft K and the receiving basket F when they are in normal operative position as seen in Fig. 5. The hub and sleeve 13 have a suitable bearing within the housing section 11 and slidable on a suitable keyway in said hub sleeve is an elongated hollow shaft 14 to the upper end of which a bell mouth 15 has a threaded connection, such bell mouth extending down through a flanged opening 16 in the housing section 12. This flanged opening 16 has an inside diameter only sufficient to receive the hollow shaft 14 which is adapted to have reciprocal movement therein or therethrough. The lower end of the hollow shaft 14 for a portion of its length is slotted or cut away as at 17 to allow for the disposition of a lead-in pipe 18 at approximately an oblique angle from the lower end of said shaft, the upper portion of said pipe extending up in the shaft, as best seen in Fig. 7 with its upper end abutting against the lower end of the bell mouth 15 which together form a continuous conduit through the bell mouth and down through said pipe for the passage of a rod directed therethrough. The lower end of the hollow shaft 14 has connected thereto an inverted cone 19 or what is termed in practice a "bell", the latter provided with a hub 20 in which the shaft is carried and said hub and bell and shaft are permanently connected by the keys 21, see Fig. 8, and having a bearing in a cross head comprising the main section 22 and the strap section 23 which are suitably bolted together. The opposite ends of this main section of the cross head are formed or provided with slide portions 24 normally engaged and having slidable relation with the spaced vertically disposed guide members 4. The mechanism including the hollow shaft 14 and the bell 19 and the cross head composed of the members 22 and 23 are supported and adapted to be moved up and down by means of cranks 25 which have a pivotal connection with links 26 which in turn have a pivotal connection with the main section 22 of said cross head substantially as seen Figs. 4 and 6 and said cranks 25 are united to and form a part of an elongated sleeve 27 journaled on a cross shaft 28 supported by the "frame", and said sleeve 27 has formed mediately thereof or connected thereto an arm 28′ to which is pivotally connected the upper end of a vertically disposed rod 29 which at its lower end has a suitable connection with the piston rod M. It will thus be observed that when the piston rod M is reciprocated that motion is imparted, through parts of members previously described, to the shaft K for tilting the basket F and for reciprocating the table J therein and at the same time impart oscillating motion to the cranks 25 resulting in reciprocal movement being imparted to the cross head composed of the members 22 and 23 and a like movement imparted to the hollow shaft 14 which has reciprocal movement in the hub sleeve 13 of the gear 10, such reciprocal movement being imparted during the continuous rotation of the gear wheel 10 and said hollow shaft 14 and bell 19 connected thereto. As will be further observed the cross head composed of the members 22 and 23 and the bell 19 and hollow shaft 14 are supported and maintained in proper position and movement imparted thereto through the agency of the cranks 25 carried by the cross shaft 28.

In Figs. 5 and 6 I have shown the lower end of the lead-in pipe 18 terminating short of the mouth of the "bell" 19 and in communication with and resting on a removable discharge shoe 30. The function of this shoe is to take up any wear incident to the frictional resistance of the discharge of the rods from the bell. The wear which would otherwise be on the end of the lead-in pipe 18 is taken up by this removable shoe, which may be replaced with more convenience and less cost than would be entailed in replacing the lead-in pipe 18. When the bell 19 is in operative position in relation to the basket F, as shown in Fig. 5 the removable shoe 30 is disposed immediately above or in the space between the pins $i$ and $i''$ so that the rod on its delivery from the lead-in pipe 18 to the basket will assume the form of a coil in the basket between said pins $i$ and $i''$, from which the coil is discharged on the raising of the bell 19 and the tilting of the basket F somewhat in the manner illustrated by the dotted lines in Fig. 2.

In Figs. 1, 2 and 5 there are shown rod pipes O which receive the rods from the last set of rolls E and direct said rods to the coiling baskets F through the bell mouths 15, the lead-in pipes 18 and the bells 19. These rod pipes O have their discharge ends normally located immediately above their respective bell mouths 15 associated with the coiling baskets to which the rods are to be directed, see for instance Figs. 3 and 7.

Figure 3:
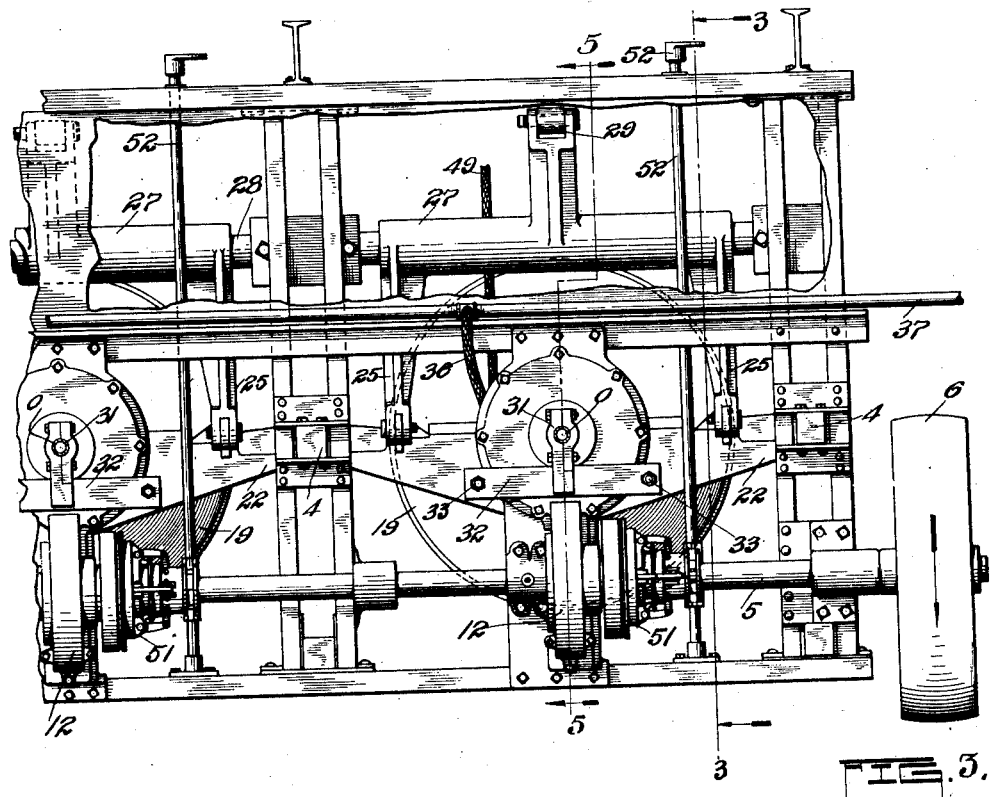
Fig. 3 is a partial top plan view of substantially what is shown in full lines in Figs. 1 and 2, except on a slightly larger scale, the view indicating that there are two or more tiltable baskets and rod guiding means.

The discharge ends of these rod pipes must of necessity be retained in close proximity to the bell mouths 15 and due to the fact that the hollow shaft 14 and bell mouths 15 are raised and lowered, as in the manner explained, the delivery ends of the rod pipes O must be simultaneously raised and lowered therewith so as to be always maintained in the same relative positions one to the other. I, therefore, connect the delivery ends of each of the rod pipes O to a bracket 31 formed of the two part clamping members as best seen in Fig. 3 and these brackets are each secured to a cross head 32 secured to the upper ends of spaced vertically disposed rods 33, the lower ends of which are connected to the main section 22 of the slidable cross head supporting the bell 19. It is obvious that when the crank arms 25 are oscillated to raise and lower the cross heads and bells 19 that the rods 33 will be simultaneously raised and lowered therewith and lift the rod pipes O at the same time that the hollow shafts 14 and their bell mouths are raised and lowered. Although not shown the rod pipes O must be jointed in their length to permit their being raised and lowered as fully explained.

It is desirable to provide suitable cooling means, especially for the bearings for the hub sleeves in the gear housings and also for the hubs 20 of the bells in the cross heads supporting the same due to the extreme heat radiated from the rods passing through lead-in pipes 18, as these parts rotate very rapidly. I accomplish this in the gear housings by providing the lower half section 11 of each thereof with a water chamber 34, see Figs. 6 and 7. Connected to and communicating with one end of each of said chambers is a water inlet pipe 35 to which is coupled a hose 36, which is also connected to a main feed pipe 37, see Figs. 3 and 6, from which it receives its source of supply, see Figs. 3 and 6. Also connected and having communication with the opposite end of each of said chambers is a discharge pipe 38 to which is coupled a hose 39, the opposite end of which is coupled to a pipe 40, see Fig. 8, connected to and in communication with one end of a water chamber 41 provided in the main section 22 of the cross head and connected to and having communication with the opposite end of said chamber 41 is a pipe 42 to which is connected a coupling 43 and to said coupling is also connected a cross pipe 44 connected with a coupling 45 which in turn has a pipe 46 connected and has communication with one end of a water chamber 47 in the strap section 23 of said cross head and to the other end of said chamber 47 is connected and has communication a pipe 48 to which is coupled a hose 49 leading to the waste. These pipe and hose connections for the respective bearings of the operating parts associated with the coiling baskets are best seen in Figs. 3, 4, 6, 7 and 8 and it is believed that the circulation of water for cooling purposes will be understood from the foregoing description. However, briefly explained in connection with one set of elements, water from the intake pipe 37 passes through the hose 36 through the water chamber 34 and thence out and into the hose 39 from whence it is delivered into the water chamber 41 and out therefrom into the cross pipe 42 and from said pipe into the water chamber 47 and from thence into the hose 49 and to a suitable waste.

It is desirable to run the gears 9 and 10, see Fig. 6, in oil and to keep the oil in circulation. Oil, therefore, will be found in the housing section 11 to be taken by the gear 9 and stripped by the gear 10 thereonto and said gear 10 being provided with openings 50 the oil will be directed therethrough and back into the main housing section 11 through a conduit 50' in a bearing of said housing section whereby the bearing for the hub of the gear 10 is effectively lubricated.

The ordinary rod mill is usually provided with a battery of rod coiling baskets or receivers and associated revolving guiding means. One complete set of devices and a partial set are shown in plan in Fig. 3.

Each of these sets of devices, that is the revolving guiding means, are under manual control the same as are the tilting baskets associated therewith. In other words it is desirable to provide controlling means for the gears 9 and 10 of each set of devices so as to place the control of the rotation of the guidings bells 19 at the disposition of an attendant. To do this each gear wheel 9 is adapted to be clutch controlled by means of a clutch mechanism 51 of any well known construction which is adapted to be actuated through a manually operated rod 52. These clutches and controlling rods are best seen in Fig. 3 and are not detailed due to the fact that this character of a control is well known in shop practice.

What I claim is:—

1. In a rod mill, in combination, a non-rotatable tiltable rod receiving and coiling basket, and a continuously revoluble rod guiding means supported to be moved toward and from said basket.

2. In a rod mill, in combination, a non-rotatable tiltable rod receiving and coiling basket, a rod pipe for guiding rods to said basket, and a continuously revoluble rod guiding means disposed between said basket and pipe and supported to be moved toward and from said basket.

3. In a rod mill, in combination, a non-rotatable tiltable rod receiving and coiling basket, a rod pipe for guiding rods to said basket, a continuously revoluble rod guiding means disposed between said basket and pipe and supported to be moved toward and from said basket, and connections between the guiding means and said rod pipe, whereby said pipe is movable with said guiding means.

4. In a rod mill, in combination, a non-rotatable tiltable rod receiving and coiling basket, a rod pipe for guiding rods to said basket, continuously revoluble rod guiding means disposed between said basket and pipe and supported to be moved toward and from said basket, connections between said guiding means and said rod pipe to facilitate the movement of said guiding means with said pipe, and clutch controlled gearing for operating said revolving guiding means.

5. In a rod mill, in combination, a non-rotatable tiltable rod receiving and coiling basket, and a continuously revoluble rod guiding means supported to be moved toward and from said basket, said basket and guiding means being so timed in their respective movements, that the guiding means is moved away from and toward the basket as said basket is tilted into dumping position and moved to receiving position.

6. In a rod mill, in combination, a non-rotatable tiltable rod receiving and coiling basket, a rod pipe for guiding rods to said basket, continuously revoluble rod guiding means disposed between said basket and pipes and supported to be moved toward and from said basket, said basket and guiding means being so timed in their respective movements, that the guiding means is moved away from and toward the basket as said basket is tilted into dumping position and moved to receiving position, and connections between said guiding means and rod pipe, whereby said pipe is movable with said guiding means.

7. In a rod mill, a guide for the rods, comprising a tubular member through which the rods are caused to pass, bearing means for the receiving end of said member and through which said member has reciprocal movement, supporting means for said member at its delivery end, guiding means for said supporting means during its reciprocal movement, and means to revolve said guide whereby to coil the rods in bundles as they leave said guide.

8. In a rod mill, a guide for the rods, comprising a tubular member through which the rods are caused to pass, bearing means for the receiving end of said member and through which said member has reciprocal movement, supporting means for said member at its delivery end, guiding means for said supporting means during its reciprocal movement, and means to revolve said guide whereby to coil the rods in bundles as they leave said guide, and means to reciprocate said guide on the completion of each bundle of rods.

9. In a rod mill, a guide for the rods, comprising a hollow shaft split for a portion of its length at its delivery end, bearing means for the receiving end of said shaft and through which said member has reciprocal movement, a bell mouth for the delivery end of said shaft, a rod tube within said shaft and terminating in said bell mouth by passing out through the split portion of said shaft, supporting means for said guide at its delivery end, guiding means for said supporting means during its reciprocal movement, and means to revolve said guide whereby to coil the rods in bundles as they leave said guide.

10. In a rod mill, a guide for the rods, comprising a hollow shaft split for a portion of its length at its delivery end, bearing means for the receiving end of said shaft and through which said member has reciprocal movement, a bell mouth for the delivery end of said shaft, a rod tube within said shaft and terminating in said bell mouth by passing out through the split portion of said shaft, supporting means for said guide at its delivery end, guiding means for said supporting means during its reciprocal movement, and means to revolve said guide whereby to coil the rods in bundles as they leave said guide, and means to reciprocate said guide on the completion of each bundle of rods.

11. In a rod mill, rod receiving means, a guide for the rods, means to rotate said guide whereby to coil the rods in bundles as they leave said guide, and means to reciprocate said guide toward and from said receiving means on the completion of each bundle of rods.

12. In a rod mill, rod receiving means, a guide for the rods, a bell mouth at the delivery end of said guide, means in said guide to direct the rods from said bell mouth at one side of its axis, means to rotate said guide whereby to coil the rods in bundles as they leave said bell mouth, and means to reciprocate said guide toward and from said receiving means on the completion of each bundle of rods.

13. In a rod mill, rod receiving means, a guide for the rods, a bearing for the receiving end of said guide provided with water cooling means and arranged for the reciprocation of said guide therein, a reciprocal support and bearing for the delivery end of said guides provided with water cooling means, guiding means for said support, and means to rotate said guide whereby to coil the rods in bundles as they leave said guide toward and from said receiving means, and means to reciprocate said guide on the completion of each bundle of rods.

14. In a rod mill, a substantially vertical rod guide, a substantially horizontal gear secured to said rod to rotate same, a second gear in mesh with the first named gear to operate the latter, said first named gear having a lubricant passage formed therethrough, a lubricant containing housing enclosing the gears, said second gear being vertically disposed and having its lower arc disposed below the first gear, and means to rotate the second gear so as to cause same to convey lubricant against the first gear and through said passage so as to maintain circulation of the lubricant about the gears.

15. In a rod mill, a substantially vertical rod guide, a bearing for the guide having a conduit, a gear having a lubricant passage connected to the guide and located above the conduit, a second gear in mesh with the first gear and disposed to convey lubricant to the first gear and a housing enclosing each of the gears and having a part thereof underlying the first gear and provided with a conduit for conducting lubricant from below the first gear to the bearing conduit and thence to the second gear whereby to maintain circulation of the lubricant about each of the gears.

16. In a rod mill, a tiltable rod receiving and coiling basket, rotatable rod guiding means, means to mount said guiding means for movement toward and away from the basket, and means for raising the guiding means and for tilting the basket.

17. In a rod mill, a tiltable rod receiving and coiling means, rod guiding means, means to mount one of said two first named means for movement toward and away from the other so as to cause predetermined spacing of the two means, means to actuate said one of said two means toward and away from the other to effect said spacing thereof, and means to tilt the rod receiving and coiling means upon said predetermined spacing of said two means.

WILLIAM H. SOMMER.